United States Patent
Engel et al.

(10) Patent No.: US 7,337,104 B2
(45) Date of Patent: Feb. 26, 2008

(54) DEVICE EMULATION IN PROGRAMMABLE CIRCUITS

(75) Inventors: Joshua R. Engel, Longmont, CO (US); Stephen D. Hanna, Longmont, CO (US); John T. Varga, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 11/051,214

(22) Filed: Feb. 3, 2005

(65) Prior Publication Data

US 2006/0173670 A1    Aug. 3, 2006

(51) Int. Cl.
G06F 9/455    (2006.01)
(52) U.S. Cl. ......................................... 703/24; 703/23
(58) Field of Classification Search .................. 703/14, 703/15, 17, 23–24, 25; 716/4, 6
See application file for complete search history.

(56) References Cited

U.S. PATENT DOCUMENTS

| | | | |
|---|---|---|---|
| 5,467,432 A * | 11/1995 | Ota ............................ 358/1.13 |
| 5,652,904 A | 7/1997 | Trimberger | |
| 5,838,908 A | 11/1998 | Matzke et al. | |
| 5,953,516 A | 9/1999 | Bonola et al. | |
| 6,047,387 A | 4/2000 | Chang et al. | |
| 6,308,255 B1 * | 10/2001 | Gorishek et al. ............ 712/209 |
| 6,501,558 B2 * | 12/2002 | Ebina et al. ................ 358/1.15 |
| 6,564,179 B1 * | 5/2003 | Belhaj .......................... 703/26 |
| 6,564,367 B1 | 5/2003 | Fujii et al. | |
| 6,571,370 B2 | 5/2003 | Kim | |
| 6,678,646 B1 | 1/2004 | McConnell | |
| 6,748,577 B2 | 6/2004 | Bal | |
| 6,799,156 B1 * | 9/2004 | Rieschl et al. ................. 703/24 |
| 7,065,481 B2 * | 6/2006 | Schubert et al. ............... 703/14 |
| 7,076,420 B1 * | 7/2006 | Snyder et al. ................. 703/28 |
| 2002/0091507 A1 | 7/2002 | Tseng | |
| 2003/0233207 A1 | 12/2003 | Yun | |
| 2003/0233634 A1 * | 12/2003 | Carrez et al. ................ 717/124 |
| 2004/0001432 A1 | 1/2004 | Wescott | |
| 2004/0250244 A1 * | 12/2004 | Albrecht ...................... 717/135 |
| 2004/0260531 A1 | 12/2004 | Buckley | |

FOREIGN PATENT DOCUMENTS

JP    11-338728    12/1999

OTHER PUBLICATIONS

Hadzic, Ilija et al. "Balancing Performance and Flexibility with Hardware Support for Network Architectures." ACM Transactions on Computer Systems vol. 21 No. 4 Nov. 2003 pp. 375-411.*

(Continued)

*Primary Examiner*—Hugh Jones
(74) *Attorney, Agent, or Firm*—Rabindranath Dutta; Konrad Raynes & Victor LLP

(57) ABSTRACT

Device emulation implemented in programmable circuits. In one aspect, an interface for providing control of a hardware device includes functional code embedded in circuitry of the interface. Emulator code is embedded in programmable circuitry of the interface to emulate the hardware device during testing of the functional code and the interface. Another aspect diagnoses errors in a system having an interface and a connected hardware device, using emulator code embedded in a programmable circuit of the interface.

14 Claims, 4 Drawing Sheets

OTHER PUBLICATIONS

IBM Technical Disclosure Bulletin, Use of Field-Programmable Gate Array with Fast Memory to Emulate an I/O Interface, vol. 37, No. 48B, Apr. 1994.

IBM Technical Disclosure Bulletin, Logic Emulation with User-Defined Asynchronous Logic, vol. 33, No. 10B, Mar. 1991.

IBM Technical Disclosure Bulletin, User Defined Asynchronous Control of a Pattern Generator, vol. 33, No. 10B, Mar. 1991.

EP/ISA, PCT/EP2006/050251 International Search Report, Mar. 10, 2006.

EP/IPEA, PCT/EP2006/050251 Written Opinion of the International Searching Authority, Mar. 10, 2006.

* cited by examiner

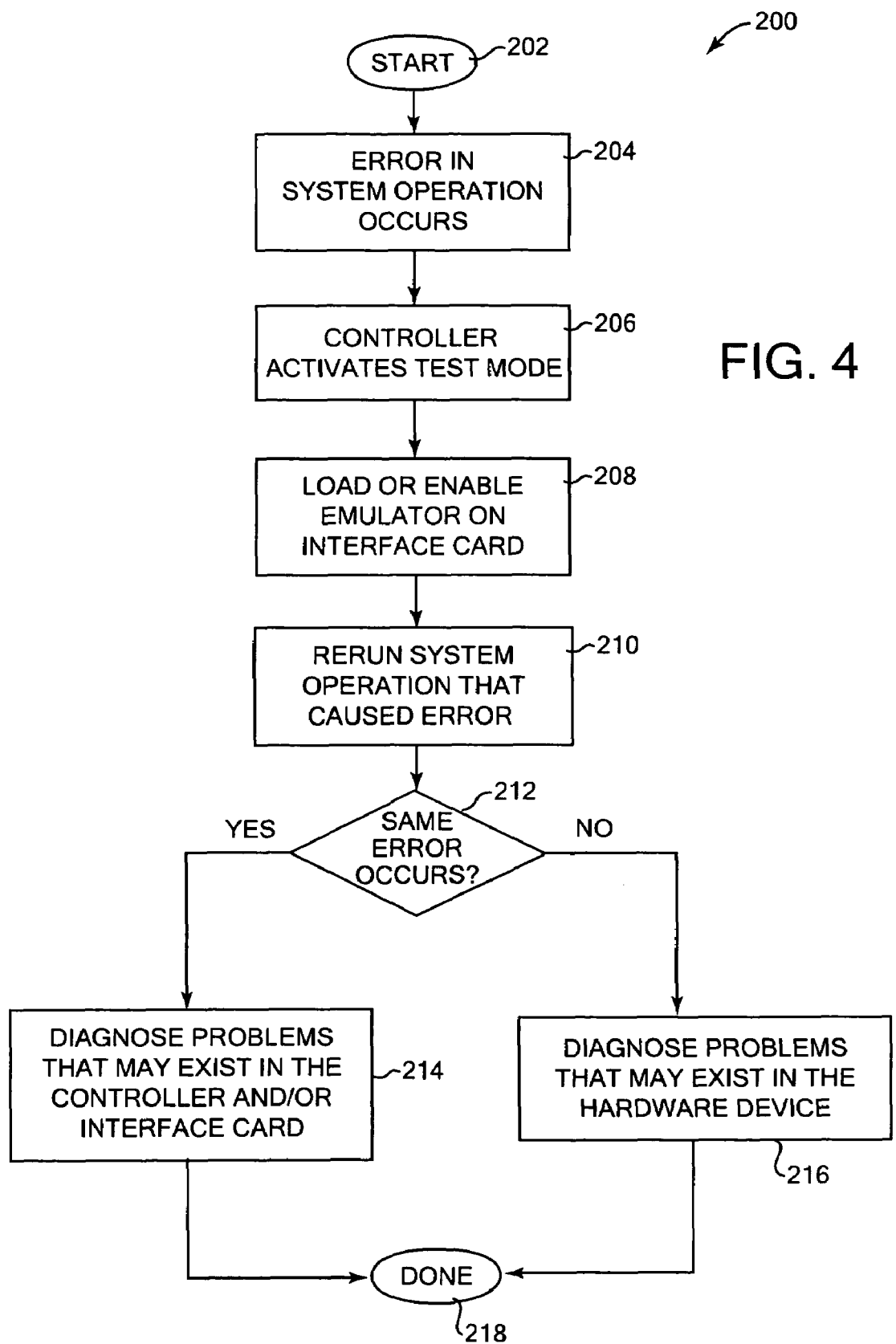

DEVICE EMULATION IN PROGRAMMABLE CIRCUITS

FIELD OF THE INVENTION

The present invention relates to emulation of hardware devices, and more particularly to emulation used in testing and development of interfaces to hardware devices.

BACKGROUND OF THE INVENTION

Interfaces for computer hardware devices are connected to controllers such as servers and other computer systems to allow the controllers to communicate with and control the hardware devices. Often, the interface takes the form of hardware such as an interface card or other module. When developing the interface for such a hardware device, the device itself is typically needed to be connected to the interface so that the interface components may be tested thoroughly to determine if they function correctly and accurately. However, some hardware devices may not be available for such interface testing due to a variety of reasons. For example, the hardware device may not be finalized or fully produced, or only exist in low quantities, or it may be difficult to obtain due to availability in its development cycle or for cost reasons.

In such cases in which the hardware device is not available for interface testing, an emulator can be used in place of the hardware device during testing of the interface. Emulation is used to enable one system to imitate or duplicate the functions of a second system. This allows the first system to accept the same data, achieve the same results, etc., as the second system. Emulators can be used in the development of interfaces for hardware devices; for example, the hardware device can be replaced by the emulator to facilitate printed circuit board (PCB) card debugging and development testing, PCB card testing in manufacturing, interface and controller software evaluation, and performance testing. The emulators allow the interface for a hardware device to be produced and tested before the hardware device exists in large quantities, or debugged at a low level without introducing the side effects of a debugger.

For example, when developing code or firmware of an interface for a hardware device like a print engine that is used to print documents on paper or other media, the hardware device can be emulated using a hardware emulator or software emulator. The hardware emulator is hardware that mimics the behavior, signals, and responses of the print engine or other hardware device, so that the code and other components of the interface can be tested in a realistic environment.

A system 10 using a hardware emulator is illustrated in the block diagram of FIG. 1. The system includes a controller 12 that intends to interface with the hardware device, such as a print engine 18. The controller 12 provides commands and data to an interface card 14, which can include embedded circuitry and code on an integrated circuit (IC) chip 16. The interface card 14 would normally output commands and data to, and receive signals from, the print engine 18. However, since the print engine 18 may not be available or conveniently obtained, an emulator card 20 can be physically connected to the same electrical connections that the print engine 18 would normally be connected to. The emulator card 20 can imitate signals of the print engine 18 to test the functional code and other components of the interface card 14 and controller 12.

Alternatively, a software emulator can be used to test the operation of a system including an interface and hardware device. For example, a computer system, such as controller 12 in FIG. 1, can run a software emulator that emulates the function and signals of both a connected interface card 14 and a hardware device connected to the interface card, such as print engine 18, without having to connect the actual interface card and hardware device to the computer system. This allows other control software running on the controller 12, which would normally communicate with the interface card 14 and device 16, to be tested in a realistic environment.

These emulators used in device test systems for developing interfaces have several disadvantages, however. For example, hardware emulators are hardwired in many of their functions and difficult to update with changes that may be needed in an emulation. Furthermore, this emulation requires additional steps such as physically connecting the emulator card to the interface card and independently powering the emulator card. The software emulators running on systems like controller 12 do not test many potential problems of interface card components, such as integrated circuit code, and timing and hardware device response, since the software emulator does not include actual hardware and cannot, for example, accurately produce timing conditions for the hardware device. Software timing is also degraded since the software emulator steals processing cycles from the driver and other software running on the controller 12.

Accordingly, what is needed is an apparatus and method for providing an emulator for a hardware device in the development of an interface for that device, which allows the testing of a variety of problems of the interface and is easily updated and modified. The present invention addresses such a need.

SUMMARY OF THE INVENTION

The invention of the present application relates to device emulation implemented in programmable circuits. In one aspect of the invention, an interface for providing control of a hardware device includes functional code embedded in circuitry of the interface, where the functional code is operative to provide control of the hardware device by sending signals to and receiving signals from the hardware device. Emulator code is embedded in programmable circuitry of the interface, the emulator code being operative to emulate the hardware device during testing of the functional code and the interface.

In another aspect, a method for testing an interface that provides control of a hardware device includes emulating the hardware device using emulator code embedded in a programmable circuit, the programmable circuit being coupled to the interface, and testing functional code provided on the interface while the functional code communicates with the emulated hardware device by sending signals to and receiving signals from the emulator code.

In another aspect, a method for diagnosing errors in a system including a hardware device, the method includes determining that an original error has occurred in the system during a system operation with the hardware device connected to the system. Emulator code embedded in a programmable circuit is enabled, the emulator code emulating the hardware device, where the programmable circuit is coupled to an interface that provides control of the hardware device. The method includes re-running the system operation during which the original error occurred with the emulator code enabled, and determining whether the original error is caused by the hardware device or by other components in the system based on any additional errors occurring during the re-running of the system operation.

The present invention provides a system that includes an emulator for a hardware device embedded in an interface, e.g., in a programmable integrated circuit on interface hardware. This allows, for example, more accurate testing of the functional code and other components of the interface hardware, where the actual interface hardware is being used in the test. Furthermore, much more flexibility and convenience is obtained when testing interfaces to hardware devices, since the emulator code can be updated or changed easily if device specifications change, and no separate emulator hardware need be connected to the interface.

BRIEF DESCRIPTION OF THE FIGURES

FIG. 4 is a flow diagram illustrating a method of the present invention for using the embedded emulator for diagnosing errors in a system including a connected hardware device.

DETAILED DESCRIPTION

The present invention relates to emulation of hardware devices, and more particularly to emulation used in testing and development of interfaces to hardware devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system architectures usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 2 through 4 in conjunction with the discussion below.

Figure 1:
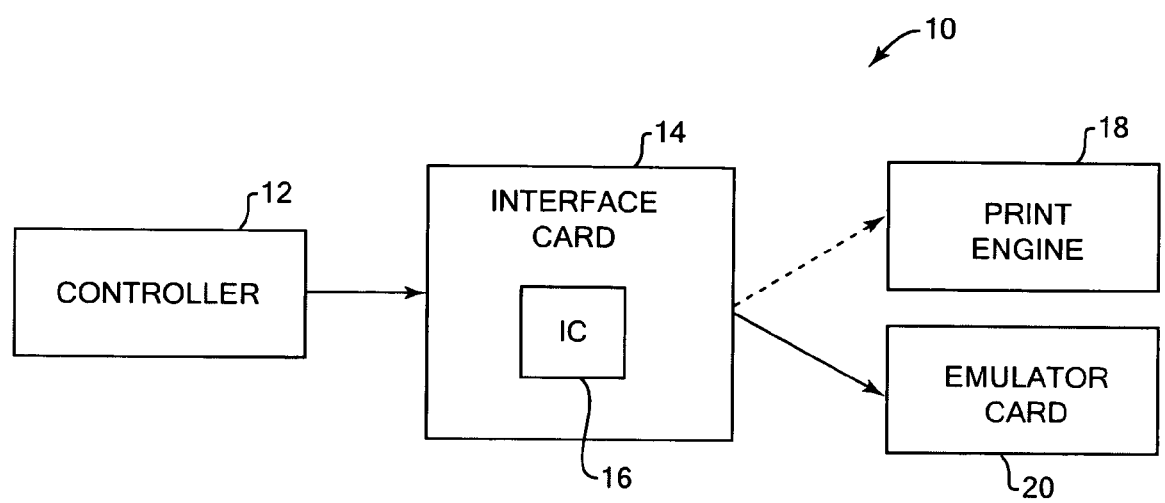
FIG. 1 is a block diagram illustrating a prior art system including a hardware emulator device.
Figure 2:
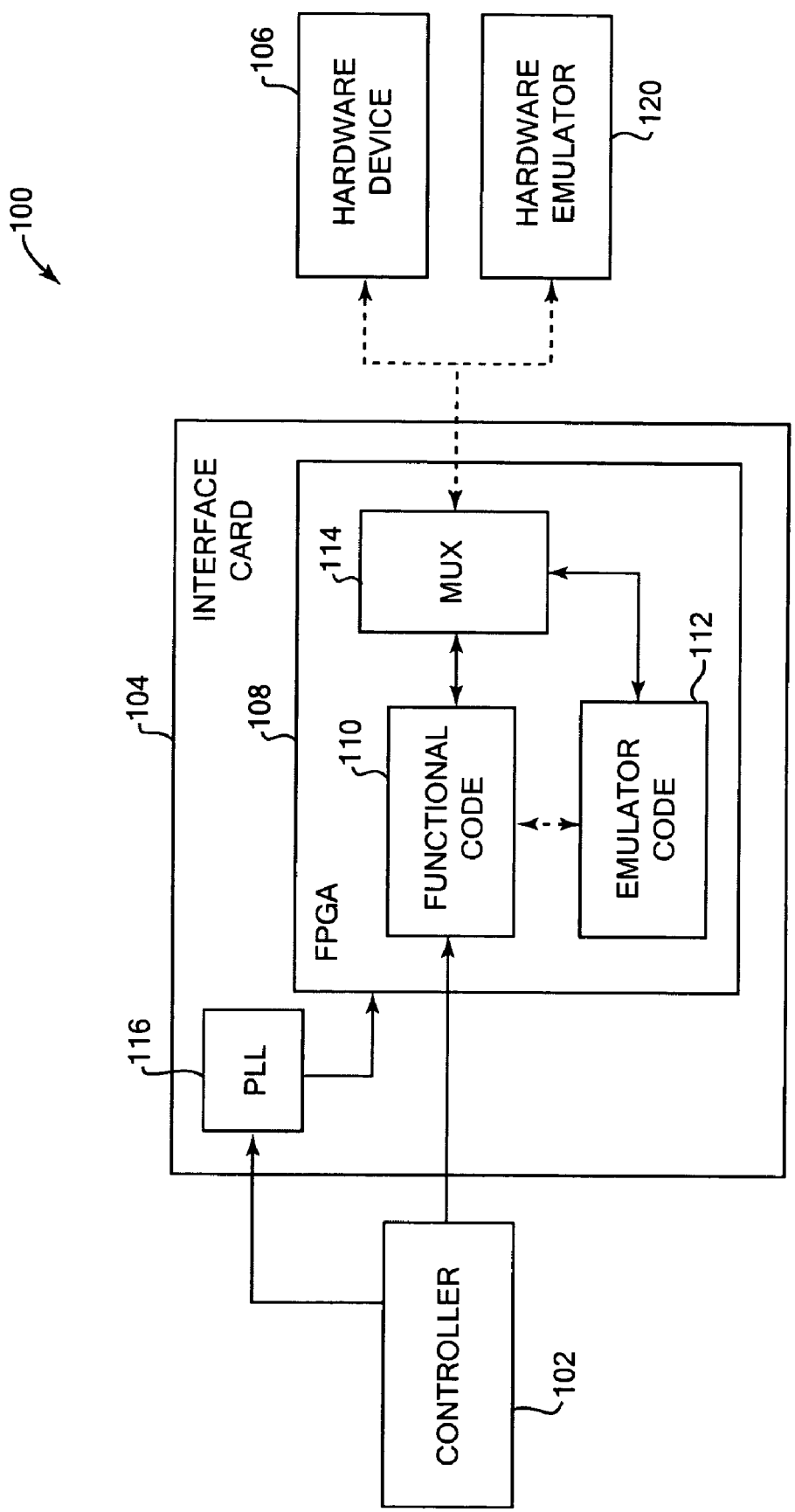
FIG. 2 is a block diagram illustrating a system of the present invention including an embedded emulator.

FIG. 2 is a block diagram illustrating a system 100 of the present invention for emulation of a hardware device in testing and development of interfaces for the hardware device. System 100 includes a controller 102, an interface card 104, and a controlled hardware device 106.

Controller 102 is a computer system or other controller device that provides commands and data to drive a hardware device 106. For example, controller 102 can be a server or other computer system, such as a desktop computer, workstation, laptop computer, portable electronic device, or other electronic device. Controller 102 typically includes one or more microprocessors and/or other processor devices, memory, storage devices (memory, hard disk(s), floppy disk(s), CD-ROM, DVD-ROM, or other optical storage, tape drive(s), etc.), the operation of which is well known to those of skill in the art. The controller 102 typically includes software or operating system that provides commands and/or data intended for the hardware device 106.

The controller 102 provides its information to an interface card 104 typically via connections such as electrical cables, card slot contacts, or even wireless connections. In other embodiments, the controller 102 can be incorporated on the interface card 104, or the interface card 104 can be incorporated in the components of controller 102. The interface card 104 can send and receive specific signals to and from the hardware device to provide the control of the device desired by the controller 102.

The interface card 104 typically has one or more integrated circuit chips which can perform the needed interface functions to control the hardware device. Preferably, the integrated circuit chip is a programmable device, allowing users to program any desired code for the chip. In the described embodiment, the interface card includes an integrated circuit chip that is a field programmable gate array (FPGA) 108, a general-purpose logic device that can be configured and programmed to perform different logic functions. FPGAs used in the design and prototyping of specialized ICs can later be produced in a faster-performing hardwired application-specific integrated circuit (ASIC) in large quantities for distribution to manufacturers and end users. In other embodiments, FPGA 108 can be an ASIC or other form of integrated circuit when used in testing and development of the hardware device 106. In other embodiments, the FPGA 108 or other chip can be provided on its own separate card or board that is connected to the interface card 104.

FPGA 108 includes functional code 110, which is the code developed to directly interface with the hardware device 106. When provided in an FPGA 108, the functional code is implemented as microcode, logic gates and components of the FPGA (or ASIC) circuitry, but can alternatively be implemented as software or firmware stored in a memory coupled to an integrated circuit. The functional code 110 can be tested and developed by connecting the hardware device 106 to the interface card 104 and allowing the functional code 110 to control functions of the hardware device 106 during test procedures. For example, the controller can send commands and/or data to the functional code, and the functional code can translate the commands and/or data into signals that can communicate with the hardware device. However, when the hardware device 106 is not readily available to be connected, then the device must be emulated so that the functional code 110 can be tested and debugged.

In the present invention, the FPGA 108 includes emulator code 112, which is used to perform the emulation of the hardware device 106. The emulator code can be implemented as microcode, logic gates and components of the FPGA (or ASIC) circuitry, or alternatively can be implemented as software or firmware stored in a memory coupled to an integrated circuit. In some embodiments, the emulator code 112 can be programmed in a separate chip or circuit than the functional code 110. When the emulator code 112 receives the signals from the functional code 110 that are intended to be sent to the hardware device 106, the code 112 processes those signals (information) and produces information that the hardware device 106 would have produced in response to those sent signals, such as acknowledgements, response signals, and status signals (error status, device status, etc.). The emulator code 112 is programmed to respond as appropriate to the specification of the hardware device 106 it is emulating. The emulator code 112 sends the response information back to the functional code 110, and the functional code 110 sends the information to the controller 102, and/or responds appropriately, etc. The emulator need not actually process any data sent by the functional code 110. For example, the functional code can send data that is intended to be printed by a print engine 106 to the emulator code 110, and the emulator code 110 will simply discard that data while responding as if the data were being printed.

The emulator code 112 can be written to a specification for a print engine 106 or other hardware device that is yet to be produced or actualized. Thus an advantage of the present invention includes the ability to develop a hardware device interface concurrently with the development and/or production of the hardware device in question. In addition, if changes are made to the specifications of the hardware device during development, the emulator code 112 can be easily changed within the programmable FPGA 108 so that the appropriate emulation of the changed device and thus up-to-date testing of the functional code 110 and other components of the interface card 104 can be performed. The emulator 112 also can function during tests of the control/driver software on controller 102 during test procedures of the system. Furthermore, the emulator code 112 can easily be incorporated into existing FPGAs or other programmable devices on hardware interfaces, thus requiring no additional hardware, and programming the emulator code 112 is much simpler than creating a full software emulator that runs on controller 102 to emulate the interface card 104 and hardware device 106.

The FPGA 108 can include a multiplexer 114 which can be used to select between connecting the functional code 110 with the emulator code 112, and connecting the functional code 110 with the hardware device 106. After selecting a connection with the emulator code 112, the multiplexer 114 sends signals from functional code 110 to the emulator code 112, and the emulator code 112 sends status signals back to the functional code 112, e.g., via the multiplexer 114 (or alternatively via direct connections or other connections). If a hardware device 106 or hardware emulator 120 is connected, the multiplexer 114 can select device 106 or 120 instead of the emulator code 112, so that the signals from functional code 110 are sent to that hardware, and the signals from the hardware are sent back to the functional code. The multiplexer 114 can be directed by the controller 102 to select between emulator and hardware device, and/or other software or firmware, or by a switch or other manual control, e.g., provided on the interface card 104, which is selectable by a user or tester to perform the multiplexer selection.

A phase-locked loop (PLL) 116 or other type of oscillator can be included on the interface card 104 in some embodiments. The PLL 116 can have an output that is provided to the FPGA 108 as a clock input. The PLL 116 can be programmed to have a desired speed or frequency that will test the FPGA functional code and other interface card components at a simulated operating frequency of the hardware device 106. The clock signal from the PLL controls the timing signals between the interface card and hardware device and allows an accurate timing emulation of the hardware device 106. The PLL clock signal can control interface response timing, handshaking speeds, and any other timing-related functions of the hardware device. For example, the PLL can be programmed to emulate the same speed that the hardware device 106 will operate, to simulate the ideal conditions when the hardware device is operating correctly. Using the clock signal, the interface card can communicate with the emulator code 112 at the same speed as with a real device 106, e.g., send print data to the device at an accurate rate. The PLL can also be set at a higher or lower frequency than the intended frequency of the hardware device 106, e.g., 10% above or below the normal frequency, to simulate the hardware device 106 operating at a higher or lower speed than its intended speed, and to test the FPGA functional code 110 and the controller 102 code under such conditions. Such a range can represent the limits of possible future designs for the hardware device 106, for example. The PLL, being a hardware oscillator, can provide actual hardware device frequencies, unlike software oscillation emulators, for example, which also have to steal processing cycles from other programs to perform the oscillation, and thus do such emulation inaccurately.

Even outside the use of a hardware oscillator such as PLL 116, the emulator of the present invention provides a much more accurate testing platform than a software emulation. This is because most of the actual interface hardware is used, including all the interface card 104 and its components; only the hardware device 106 is emulated. Furthermore, the emulator code 112 on the interface card 104 is also able to be more accurate and correct with the emulation of device timing, sequencing, interrupt handling, and the like, due to not sharing processing resources in a software emulation implemented on the controller 102.

The hardware device 106 is the device with which the interface card 104 is designed to interface and which the emulator code 112 emulates. It should be noted that the hardware device 106 does not need to be present, or be connected, for the system 100 to operate, but can be connected in some embodiments. The hardware device 106 can be connected to the interface card 104 via physical connections, wireless connections, etc. In one embodiment, the hardware device 106 can include a print engine that prints images on a medium such as paper, e.g., the hardware that does the actual impression of toner to paper, and can include the electronics and interface needed to control the print engine. In other embodiments, the hardware device 106 can be a different type of hardware device that is communicating with the controller 102, such as any computer peripheral device (modem, fax machine, scanner, audio output device, display device, etc.), or other electromechanical device that can be controlled electronically.

In some embodiments, a hardware emulator 120 can be connected to the interface card 104 instead of the hardware device 106. Although the embedded emulator code 112 can perform most of the emulation functions of the hardware emulator, it cannot emulate some components, such as, for example, the physical transfer medium between interface card 104 and the hardware device 106. Thus, the hardware emulator 120 can be used during testing to emulate physical connections and other components or functions which the emulator code 112 cannot, while the emulator code 112 emulates the remaining functionality. In some embodiments, the components of the hardware emulator can be added to the interface card 104. Similarly, a software emulator running on the controller 102 can emulate the interface card 104 and device 106 during a different test procedure to test the operation of controller 102.

Figure 3:
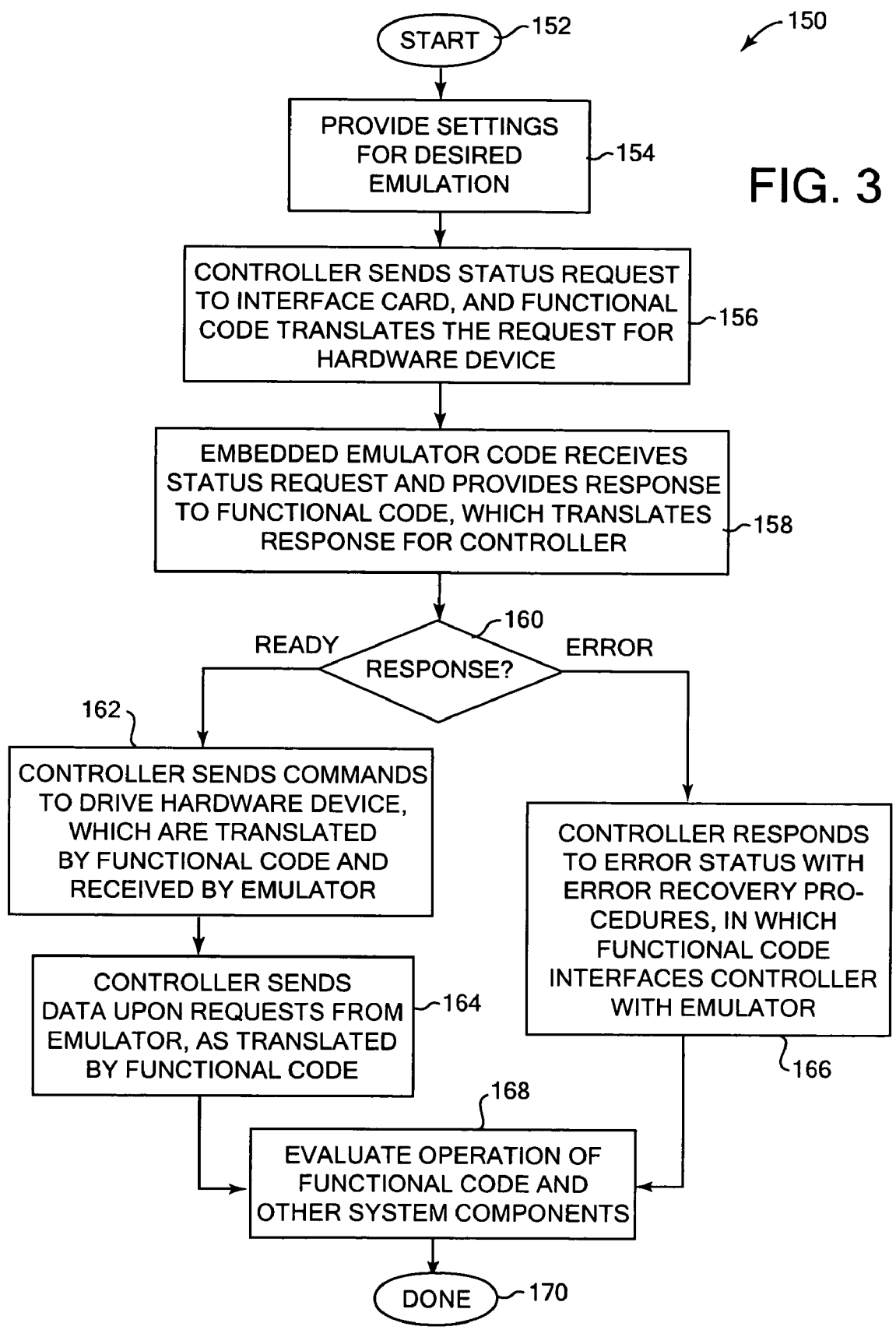
FIG. 3 is a flow diagram illustrating an example method of the operation of the system shown in FIG. 2.

FIG. 3 is a flow diagram illustrating a method 150 that is an example of the testing operation of the system 100 shown in FIG. 2. Method 150 can be implemented by program instructions of software and/or hardware in the various components of the system. Program instructions can be stored on a computer readable medium, such as memory, hard drive, other magnetic disk, optical disk (CD-ROM, DVD-ROM), etc. Hardware implementations can use logic gates, circuitry, etc. In the method 150, the hardware device 106 can be connected to the interface card 104, or can be absent from the system; it is not needed during testing using the emulated hardware device.

If a multiplexer 114 (or other switching capability) is included on interface card 104, this method is in the test "mode" of the interface card 104 during which emulation is performed, as opposed to the functional mode of the interface in which the actual hardware device is controlled. In other embodiments without such switching capability, the emulator code 112 can be erased or overwritten in the FPGA 108 when the tests using the code are complete, a functional mode is desired, or if emulation is not desired.

The process begins at 152, and in step 154, the settings for the desired emulation are provided to the interface card 104 and to the emulation code 112 implemented by the card. For example, the controller 102 can provide particular settings for a test procedure that will simulate the emulated hardware device functioning correctly during normal operation, or functioning abnormally during an error or malfunction. For example, the emulator can be instructed to perform in a state simulating a paper jam for a print engine hardware device 106. Other settings can include switching the multiplexer 114 to interface with the emulator code 112 rather than with the hardware device 106, and setting the PLL 116 (if present) to a desired frequency simulating the hardware device operating at that frequency. In some embodiments, a user can set some or all of the settings for emulation using hardware switches on the interface card or software switches set via controller 102 or other connected controller.

In step 156, the controller 102 sends a status request to the interface card 104 that requests the current status of the hardware device being emulated. This can be performed, for example, just before the controller wishes to control the operation of the hardware device 106. The functional code 110 running on the interface card on FPGA 108 or other integrated circuit receives the status request and translates the request into a form that is understood by the hardware device 106.

In step 158, the embedded emulator code 112 running on the interface card 104 receives the status request and provides a response the same as the hardware device would provide when receiving the status request. The emulator receives the status request via the multiplexer 114 if it is present in the FPGA or on the interface card. The emulator code has been programmed with the possible responses of the hardware device to particular signals and commands, which can be stored on the FPGA 108 or other available storage device. For example, a particular error bit on a signal that is set for a mechanical failure can be set by the emulator if it has been told to emulate a mechanical failure. The emulator provides the response to the functional code 110, e.g., through the multiplexer 114, and the functional code 110 translates the response to a form that can be understood by the controller 102 and provides the response to the controller. The functional code also provides the correct timing, sequencing and real time command status monitoring of the hardware device 106, and can control rendering of data, compression of data, commands and status signals sent to/received from the hardware device 106, voltage levels for the device, and other control related functions.

In step 160, the process determines the content of the response provided by the emulator. For example, the controller 102 can examine the response content. If the response indicates that the (emulated) hardware device is "ready," i.e., able to receive and implement commands from the controller, then the process continues to step 162, in which the controller 102 sends commands to the interface card 104 to control the hardware device, e.g., print output from a print engine hardware device 106. The controller commands are translated by the functional code 110 and provided to the emulator code 112 similarly as the status request of step 156. In step 164, the controller sends data (or other appropriate information) to the interface card 104 upon requests from the emulator code 112, as translated by the functional code 110. For example, after the command from step 162 has instructed the emulated print engine 106 to print, the emulator 112 requests data from the controller to print, and after a portion of the data is provided by the controller, requests the next portion of data, etc. Once complete, the process then continues to step 168, described below.

If the status response from the emulator that is examined in step 160 indicates that the (emulated) hardware device has an error status (or is otherwise not ready to function), then the process continues to step 166. For example, the error status can indicate that the hardware device is not powered, or that a malfunction has occurred, e.g., the error status for a print engine could be a paper jam or similar error. In step 166, the controller 102 responds to the received error status with an error recovery procedure that is appropriate to the type and specifics of the error. The functional code 110 interfaces between the controller 102 and the emulator code 112. For example, the controller 102 could send requests to read the complete status of the system from registers on the interface card 104 and hardware device 106 so that a more complete diagnostic can be performed. The emulator code 112 provides the desired responses to the functional code 110 and controller 102 to emulate an error condition, i.e., the signals sent by the hardware device under the particular error being emulated are known by the emulator and sent appropriately. The process then continues to step 168.

In step 168, the operation of the functional code 110 and any other appropriate components of the system, for example interface card components and/or the controller 102, are evaluated based on the results of the testing performed using the emulator code 112 in steps 154-166. It is known from the testing whether the functional code 110, controller 102, and/or other components performed as intended during operating conditions of the hardware device. The evaluation of step 168 can be performed at any time, or multiple times, during the process 150, or after several tests of steps 152-166 have been performed, as desired. The process is then complete at 170.

The process of the present invention thus is able to accurately test the functionality of the interface card 104, the functional code 110, and the controller 102 as it pertains to the operation of the hardware device 106, without having to connect the hardware device 106, and without requiring additional emulator hardware.

FIG. 4 is a flow diagram illustrating a method 200 of the present invention for using the embedded emulator of the present invention for diagnosing errors in a system including an interface and connected hardware device. In this method, the hardware device is connected to the interface card 104 and is operated under various tests until errors or malfunctions in the system operation are detected. This method of the present invention can be used in a diagnostic procedure to determine whether the hardware device or some other component is the cause of the error(s).

The method begins at 202, and in step 204, while operating the hardware device and the system similar to the one shown in FIG. 2, a system operation causes an error to occur.

This error causes a halt to the system operation, or the controller 102 or interface card 104 halts the operation after detecting the error. In step 206, a test mode of the invention is activated (e.g., by controller 102), in which the cause of the error can be diagnosed. In step 208, during the initialization of the test mode, the emulator code 112 on the interface card 104 is enabled (and loaded onto the FPGA 108 or other programmable device of the interface card 104 if the emulator code was not already loaded), and the output of the functional code 110 is switched to be provided to the inputs of the emulator code 112 by the multiplexer 114. In embodiments not including a multiplexer 114, the hardware device 106 is otherwise disconnected from the output of the interface card 104 as the emulator code 112 receives information intended for the hardware device.

In step 210, the operation of the system that caused the error is re-run. For example, the state of the system at the time of the error is duplicated and the system is allowed to run similarly. In some cases, the system may have to be completely initialized and run from the beginning of the test in the same way that caused the error originally. In step 212, the process checks whether substantially the same error occurs. For example, a substantially-same error would provide the same result, e.g., halt the system operation, or provide a particular error message, at the same time (or approximately the same time) and/or the same (or approximately same) system state as the original error.

If the same error occurs, then in step 214 problems that may exist in the controller 102 and/or the interface card 104 (and any other components provided before the hardware device 106) can be checked and diagnosed; however, potential problems in the hardware device 106 can be excluded from consideration. This is because the emulator code 112 runs an ideal emulation of the hardware device 106 in this testing procedure, and always returns the proper signals in response to information provided to it. Thus, the emulator 112 cannot emulate an error caused by an unknown source within the hardware device (and assuming the emulator code has no errors); the emulator code can only provide error messages if explicitly programmed to do so, e.g. during an error test. Since an error has occurred, the source of the error must reside in the controller 102 and/or the interface card 104. Thus the troubleshooting of the problem can commence, excluding the hardware device from consideration.

If the same error does not occur in step 212, then in step 216 problems that may exist in the hardware device 106 can be checked and diagnosed. Potential problems in the controller 102, interface card 104, and any other components provided before hardware device 106 can be excluded from consideration. This is because of similar reasons as described above for step 214; since the emulator provides ideal operation of the hardware device 106, the fact that the same error has not occurred once the emulator substituted for the hardware device implies that the original error was caused by the hardware device 106 when it was connected. Troubleshooting of the error can thus commence for only the hardware device 106 (and any other connections or components which were not emulated). After step 214 or 216, the process is complete at 218.

Thus the method 200 of the present invention allows a much more efficient troubleshooting and diagnostic process of system errors to be performed, by excluding components that cannot have been the source of the error, as indicated by re-running the test when the emulator code 112 is operating.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing control of a hardware device, the system comprising:
   a controller; and
   an interface card that couples the hardware device to the controller, wherein:
   (i) settings for a desired emulation of a hardware device are provided to the interface card;
   (ii) the controller sends a request to the interface card, wherein the request is for determining a status of the hardware device, wherein functional code included in the interface card translates the request for the hardware device;
   (iii) emulator code included in the interface card provides a response to the functional code, in response to receiving by the emulator code the request, wherein responses provided by the emulator code emulate responses of the hardware device;
   (iv) a determination is made from the response as to whether the hardware device is ready;
   (v) the controller sends commands to drive the hardware device, if the hardware device is ready, wherein the commands are translated by the functional code and received by the emulator code;
   (vi) the controller sends data in response to requests from the emulator code as translated by the functional code; and
   (vii) operation of the functional code and other components are evaluated.

2. The system of claim 1, wherein the emulation of the hardware device includes the emulator code receiving signals from and providing signals to the functional code.

3. The system of claim 1, wherein the programmable circuitry in which the emulator code is embedded is provided in a field programmable gate array (FPGA).

4. The system of claim 3, wherein the functional code is embedded in programmable circuitry of the FPGA.

5. The system of claim 1, further comprising a multiplexer coupled to the functional code and the emulator code, wherein the multiplexer is operative to switch between the connection of the functional code and the hardware device, and the connection of the functional code and the emulator code.

6. The system of claim 1, further comprising a hardware oscillator coupled to the emulator code and the functional code and used for simulating an operating frequency of the hardware device, wherein the oscillator is programmable in its output frequency.

7. The system of claim 1, wherein the hardware device includes a print engine.

8. A method, comprising:
   providing settings for a desired emulation of a hardware device to an interface card that couples the hardware device to a controller;
   sending, by the controller, a request to the interface card, wherein the request is for determining a status of the hardware device, wherein functional code included in the interface card translates the request for the hardware device;
   providing, by emulator code included in the interface card, a response to the functional code, in response to receiving by the emulator code the request, wherein responses provided by the emulator code emulate responses of the hardware device;

determining from the response whether the hardware device is ready;

sending, by the controller, commands to drive the hardware device, if the hardware device is ready, wherein the commands are translated by the functional code and received by the emulator code;

sending, by the controller, data in response to requests from the emulator code as translated by the functional code; and evaluating operation of the functional code and other components.

9. The method of claim 8, wherein the controller provides commands and data to the interface card, and wherein the functional code provides the commands and data to the emulated hardware device.

10. The method of claim 8, further comprising switching the outputs of the functional code from the hardware device to the input of the emulator code using a multiplexer.

11. The method of claim 8, further comprising providing a clock signal to the emulator code from a hardware oscillator to allow emulation of an operating frequency of the hardware device.

12. The method of claim 11, wherein the hardware oscillator is programmed to output a clock signal having a particular frequency above or below the standard operating frequency of the hardware device.

13. The method of claim 8, wherein the hardware device includes a print engine.

14. The method of claim 8, wherein the emulator code and the functional code are embedded in programmable circuitry of a field programmable gate array (FPGA).

* * * * *